US008982952B2

United States Patent
Drezner et al.

(10) Patent No.: US 8,982,952 B2
(45) Date of Patent: Mar. 17, 2015

(54) METHOD AND SYSTEM FOR USING MOTION VECTOR CONFIDENCE TO DETERMINE A FINE MOTION ESTIMATION PATCH PRIORITY LIST FOR A SCALABLE CODER

(75) Inventors: David Drezner, Raanana (IL); Gideon Kojokaro, Ramat Hasharon (IL); Yehuda Mittelman, Yokneam (IL)

(73) Assignee: Broadcom Corporation, Irvine, CA (US)

( * ) Notice: Subject to any disclaimer, the term of this patent is extended or adjusted under 35 U.S.C. 154(b) by 1543 days.

(21) Appl. No.: 12/131,648

(22) Filed: Jun. 2, 2008

(65) Prior Publication Data

US 2009/0296816 A1  Dec. 3, 2009

(51) Int. Cl.
*H04N 11/02* (2006.01)
*H04N 19/53* (2014.01)
*H04N 19/61* (2014.01)

(52) U.S. Cl.
CPC ............. *H04N 7/26776* (2013.01); *H04N 7/50* (2013.01)
USPC ............. 375/240.16; 375/240.21; 375/240.24

(58) Field of Classification Search
None
See application file for complete search history.

(56) References Cited

U.S. PATENT DOCUMENTS

| 5,654,771 | A | * | 8/1997 | Tekalp et al. ................. 348/699 |
| 6,195,389 | B1 | * | 2/2001 | Rodriguez et al. ....... 375/240.16 |
| 6,408,029 | B1 | * | 6/2002 | McVeigh et al. ......... 375/240.13 |
| 6,414,997 | B1 | * | 7/2002 | Piccinelli et al. ........ 375/240.17 |
| 6,690,730 | B2 | * | 2/2004 | Choi ....................... 375/240.16 |
| 6,795,503 | B2 | * | 9/2004 | Nakao et al. ............. 375/240.16 |
| 6,813,315 | B1 | * | 11/2004 | Auyeung et al. ......... 375/240.16 |
| 2002/0031179 | A1 | * | 3/2002 | Rovati et al. ............. 375/240.16 |

* cited by examiner

*Primary Examiner* — Hassan Phillips
*Assistant Examiner* — Mark A Mais
(74) *Attorney, Agent, or Firm* — Foley & Lardner LLP; Christopher J. McKenna; Helen H. Zhang

(57) ABSTRACT

Methods and systems for using motion vector confidence to determine a FME patch priority list for a scalable coder are disclosed, and may include a fine motion estimator receiving a plurality of coarse motion vectors and corresponding confidences. A patch list may be generated based on the corresponding confidences of the coarse motion vectors. The patch list may then be used to determine a search area. Each video block in a present picture may be matched to the video blocks in the search area to find the best match. A fine motion vector may be determined for each video block in the present picture with respect to a video block in the search area.

20 Claims, 16 Drawing Sheets

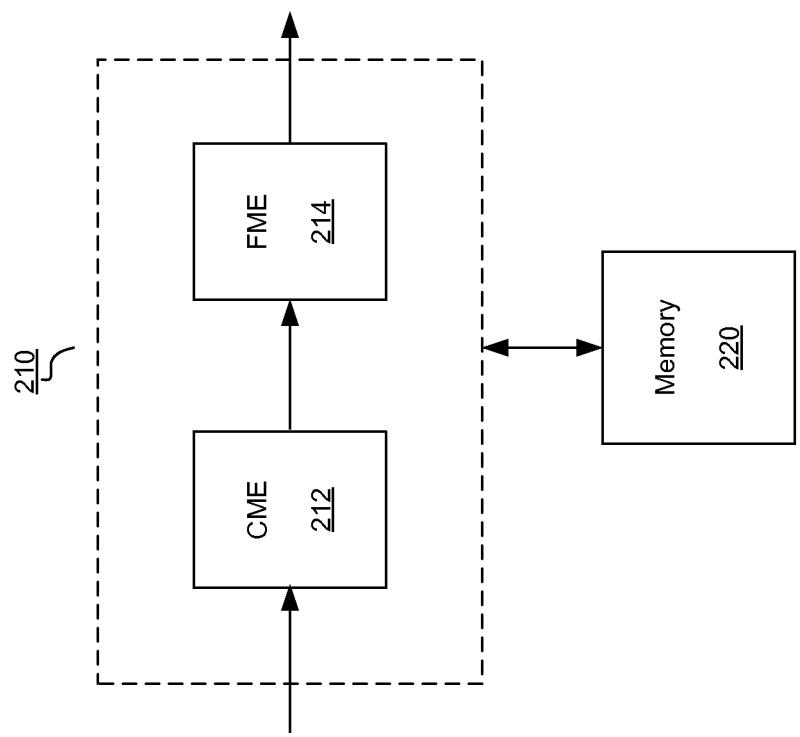

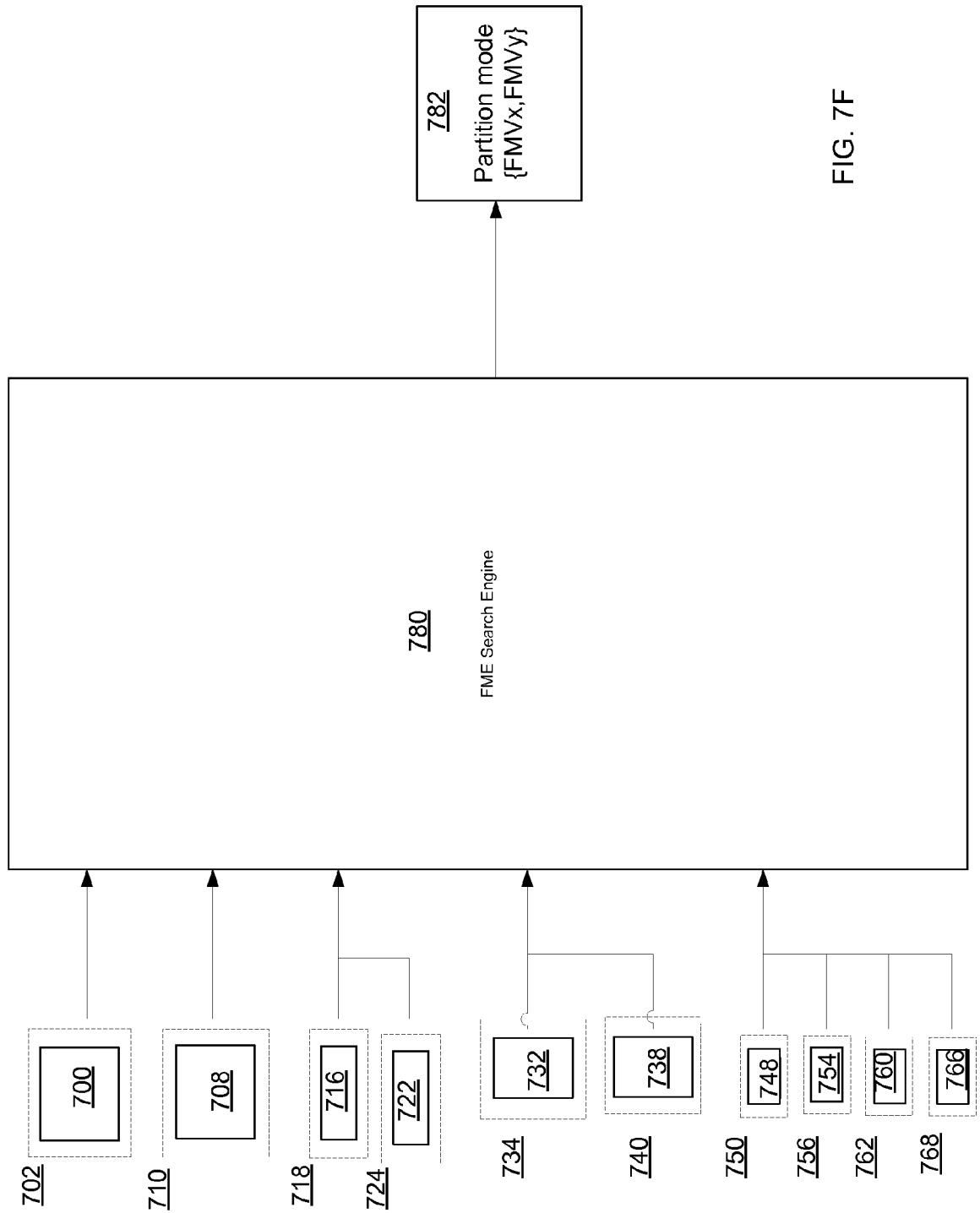

| Group | Patch ID | Description |
|---|---|---|
| 900a Null16x16 (Mode 1) | 0 | Patch associated with null CMV (zero displacement CMV9) |
| 900b Current 16x16 (Mode 1) | 1 | Patch associated with current CMV (CMV4) |
| 900c 16x16 (Mode 2) | 2 | Patch associated with upper CMV (CMV1) |
|  | 3 | Patch associated with lower CMV (CMV7) |
| 900d 8x16 (Mode 3) | 4 | Patch associated with left CMV (CMV3) |
|  | 5 | Patch associated with right CMV (CMV5) |
| 900e 8x8 (Mode 4) | 6 | Patch associated with upper left CMV (CMV0) |
|  | 7 | Patch associated with upper right CMV (CMV2) |
|  | 8 | Patch associated with lower left CMV (CMV6) |
|  | 9 | Patch associated with lower right CMV (CMV8) |

FIG. 9

| Patch ID | Ref Index | Luma/Chroma | Required/Optional |
|---|---|---|---|
| 0 | ref0 | Luma | Required |
| 1 | ref0 | Luma | Optional |
| 2 | ref0 | Luma | Optional |
| 3 | ref0 | Luma | Optional |
| 4 | ref0 | Luma | Optional |
| 5 | ref0 | Luma | Optional |
| 6 | ref0 | Luma | Optional |
| 7 | ref0 | Luma | Optional |
| 8 | ref0 | Luma | Optional |
| 9 | ref0 | Luma | Optional |
| 0 | ref0 | Chroma | Optional |
| 1 | ref0 | Chroma | Optional |
| 2 | ref0 | Chroma | Optional |
| 3 | ref0 | Chroma | Optional |
| 4 | ref0 | Chroma | Optional |
| 5 | ref0 | Chroma | Optional |
| 6 | ref0 | Chroma | Optional |
| 7 | ref0 | Chroma | Optional |
| 8 | ref0 | Chroma | Optional |
| 9 | ref0 | Chroma | Optional |

FIG. 9A

914
Calculate group confidences

Ref0-Group Confidence-Curr16x16 = 4 * (CMV4_MV_Confidence) + Favor16x16
Ref0-Group Confidence-16x8= 2 × (CMV1_MV_Confidence + CMV7_MV_Confidence) + Favor16x8
Ref0-Group Confidence-8x16= 2 × (CMV3_MV_Confidence + CMV5_MV_Confidence) + Favor8x16
Ref0-Group Confidence-8x8=CMV0_MV_Confidence + CMV2_MV_Confidence + CMV6_MV_Confidence + CMV8_MV_Confidence.

Ref1-Group Confidence-Curr16x16 = 4 * (CMV4_MV_Confidence) + Favor16x16
Ref1-Group Confidence-16x8= 2 × (CMV1_MV_Confidence + CMV7_MV_Confidence) + Favor16x8
Ref1-Group Confidence-8x16= 2 × (CMV3_MV_Confidence + CMV5_MV_Confidence) + Favor8x16
Ref1-Group Confidence-8x8=CMV0_MV_Confidence + CMV2_MV_Confidence + CMV6_MV_Confidence + CMV8_MV_Confidence.

Ref0-Group Confidence Max = MAX ( Ref0-Group Confidence-Curr16x16 , Ref0-Group Confidence-16x8 , Ref0-Group Confidence-8x16 ,Ref0- Group Confidence-8x8)
Ref1-Group Confidence Max = MAX ( Ref1-Group Confidence-Curr16x16 , Ref1-Group Confidence-16x8 , Ref1-Group Confidence-8x16 ,Ref1- Group Confidence-8x8)

FIG. 9C

METHOD AND SYSTEM FOR USING MOTION VECTOR CONFIDENCE TO DETERMINE A FINE MOTION ESTIMATION PATCH PRIORITY LIST FOR A SCALABLE CODER

CROSS-REFERENCE TO RELATED APPLICATIONS/INCORPORATION BY REFERENCE

[Not Applicable.]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of video data. More specifically, certain embodiments of the invention relate to a method and system for using motion vector confidence to determine a fine motion estimation patch priority list for a scalable coder.

BACKGROUND OF THE INVENTION

In the past, methods for estimating motion vectors have been so expensive that it was only cost-effective to perform motion-estimation and/or motion-compensation (ME/MC) in high-end video processors. However, recent advances in technology and reductions in cost have changed this situation, and ME/MC algorithms have become cost-effective in many consumer-level devices. ME/MC is currently being developed for, if not actively used in, current generation televisions, set-top boxes, DVD-players, and various other devices, to perform, for example, temporal filtering, de-interlacing, frame rate conversions, cross chroma reduction, as well as for video data compression.

Various video compression methods, including MPG1, MPEG2, and MPEG4-part10, which may also be referred to as advanced video coding (AVC), may generate data for a present video picture that may indicate differences between the present video picture and reference video pictures. Much of the compression of the video data may be due to algorithms that enable motion estimation between successive temporal frames. However, motion estimation may require a great deal of processing and memory bandwidth.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for using motion vector confidence to determine a fine motion estimation patch priority list for a scalable coder, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is an exemplary block diagram of a portion of a video coder, which may be utilized in connection with an embodiment of the invention.

FIG. 7F is an exemplary diagram illustrating generation of fine motion vectors, in accordance with an embodiment of the invention.

FIG. 9 is a diagram illustrating exemplary mapping of coarse motion vectors as video patches, in accordance with an embodiment of the invention.

FIG. 9A is a diagram illustrating an exemplary priority list of patches, in accordance with an embodiment of the invention.

FIG. 9C is a diagram illustrating exemplary algorithm for calculating group confidences, in accordance with an embodiment of the invention.

DETAILED DESCRIPTION OF THE INVENTION

Certain embodiments of the invention may be found in a method and system for using motion vector confidence to determine a fine motion estimation patch priority list for a scalable coder. Aspects of the invention may comprise a fine motion estimation block (fine motion estimator) that receives a plurality of coarse motion vectors and corresponding confidences from a coarse motion estimation block. A patch list, which may comprise patch entries, or video block entries, may be generated based on the corresponding confidences of the coarse motion vectors. The patch list may then be used to determine a search area. Each video block in a present picture may be matched to the video blocks in the search area to find a best match. Accordingly, a fine motion vector may then be determined for each video block in the present picture with respect to a video block in the search area.

The patch list may comprise luma patches, chroma patches, and/or null patches from each reference picture. A null patch may be a video block that may be in the same video block position in a reference picture as the video block in the present picture for which a fine motion vector is being generated. The patch list may be sorted by a group confidence that corresponds to each patch in the patch list. The group confidences may be generated based on the confidences of the coarse motion vectors. A null patch may be inserted as a first entry of the sorted patch list when all group confidences that correspond to that null patch are below a threshold value. Similarly, a null patch may be inserted as a last entry of the sorted patch list when at least one group confidence that corresponds to that null patch is greater than or equal to a threshold value.

Figure 1A:
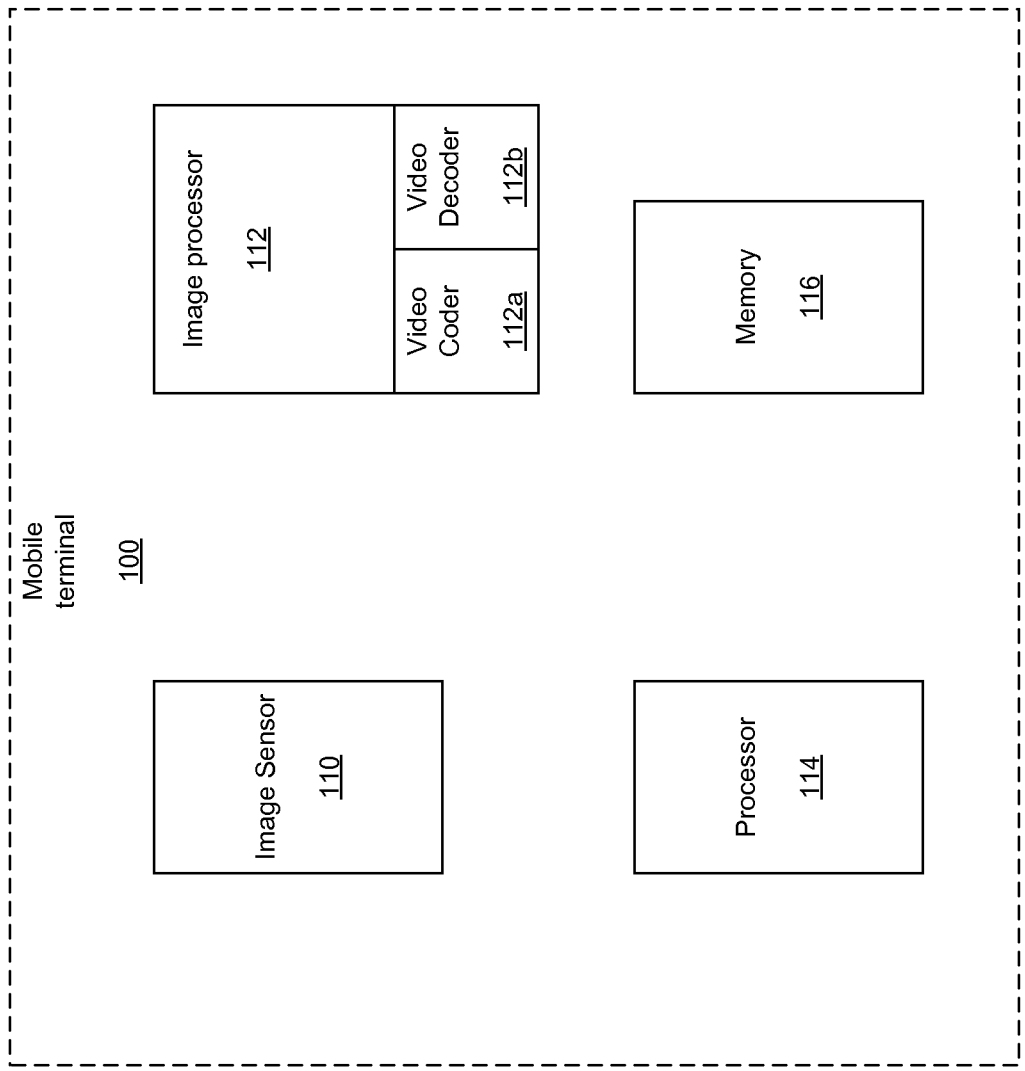
FIG. 1A is an exemplary block diagram of a portion of an electronic device, which may be utilized in connection with an embodiment of the invention.

FIG. 1A is an exemplary diagram of a portion of an electronic device, in accordance with an embodiment of the invention. Referring to FIG. 1A, there is shown an electronic device 100. The electronic device 100 may comprise an image sensor 110, an image processor 112, a processor 114, and a memory block 116. The image sensor 110 may comprise suitable circuitry and/or logic that may enable capture of light intensity at a plurality of colors, such as, for example, red, green, and blue. The captured light intensity levels may be further processed as video and/or still photograph outputs. These color levels may be converted to the YUV color space, for example, and the resulting image information may be communicated to, for example, the image processor 112 for further processing.

The image processor 112 may comprise suitable circuitry and/or logic that may enable processing of video information. The image processor 112 may comprise a video coder block 112*a* and a video decoder block 112*b*. The video coder block 112*a* may comprise suitable logic, circuitry, and/or code that may enable compression of video data. The video decoder block 112*b* may comprise suitable logic, circuitry, and/or code that may enable decompression of video data for display. The processor 114 may determine the mode of operation of various portions of the electronic device 100. For example, the processor 114 may set up data registers in the image processor block 112 to allow direct memory access (DMA) transfers of video data to the memory block 116. The processor may also communicate instructions to the image sensor 110 to initiate capturing of images. The memory block 116 may be used to store image data that may be processed and communicated by the image processor 112. The memory block 116 may also be used for storing code and/or data that may be used by the processor 114. The memory block 116 may also be used to store data for other functionalities of the electronic device 100. For example, the memory block 114 may store data corresponding to voice communication.

In operation, the processor 114 may initiate image capture by the image sensor 110. The image sensor 110 may communicate the video data corresponding to the captured images to the image processor 112. The video coder block 112*a* in the image processor 112 may, for example, compress the video data for storage and/or communication to another device. In an exemplary embodiment of the invention, during video compression, the video coder block 112*a* may utilize motion vector confidence to determine a fine motion estimation patch priority list for a scalable coder. This is described in more detail with respect to FIGS. 2-7. The image processor 112 may also decode video data that may be communicated to the electronic device 100. Decoding may be achieved via the video decoder block 112*b*. The video data in the memory block 116 may be further processed by, for example, the processor 114.

Figure 1B:
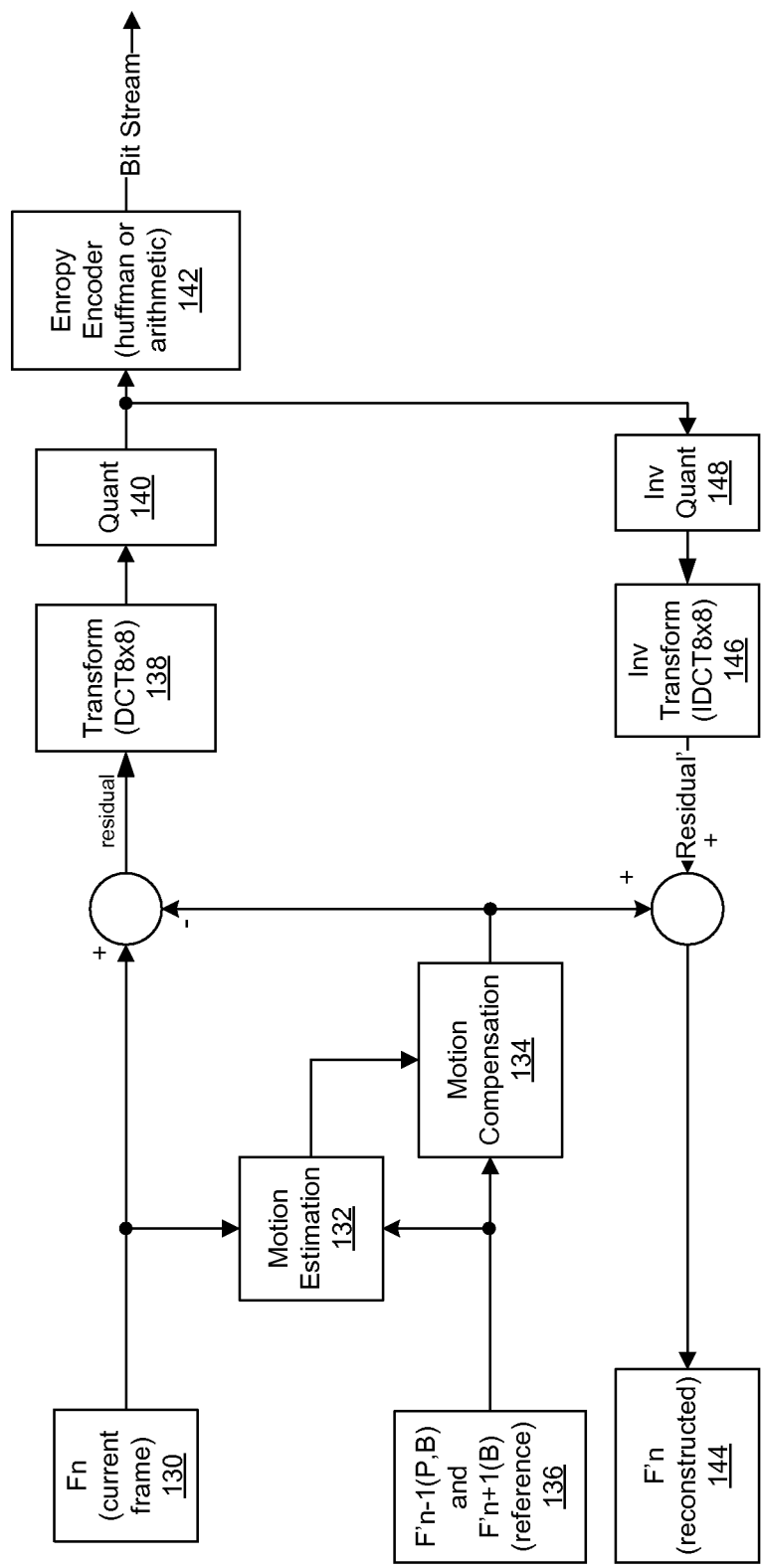
FIG. 1B is an exemplary diagram of an MPEG inter coding scheme, which may be utilized in connection with an embodiment of the invention.

FIG. 1B is an exemplary diagram of an MPEG inter coding scheme, which may be utilized in connection with an embodiment of the invention. Referring to FIG. 1B, there is shown buffers 130, 136, and 144, a motion estimation block 132, a motion compensation block 134, a DCT transform block 138, a quantizer block 140, an entropy encoder block 142, an inverse quantizer block 148, and an inverse transform block 146.

The buffer 130 may hold the original pixels of the current frame and the buffer 136 may hold reconstructed pixels of previous frame and a next frame. An encoding method from, for example, MPEG standard, may use the motion estimation block 132 to process a block of 16×16 pixels in the buffer 130 and a corresponding block of pixels and to find a motion vector for the block of 16×16 pixels. The motion vector may be communicated to the motion compensation block 134, which may use the motion vector to generate a motion compensated block of 16×16 pixels from the reconstructed pixels stored in the buffer 136. The motion compensated block of 16×16 pixels may be subtracted from the original pixels from the buffer 130, and the result may be referred to as residual pixels.

The residual pixels may be DCT transformed by DCT transform block 138, and the resulting DCT coefficients may be quantized by the quantizer block 140. The quantized coefficients fro the quantizer block 140 may be communicated to the entropy encoder 142 and the inverse quantizer block 148. The entropy encoder block 142 may scan the quantized coefficients in zig-zag scan order or alternate scan order.

The quantized coefficients may be processed by the inverse quantizer block 148 and then by the inverse DCT transform block 146 to generate reconstructed residual pixels. The reconstructed residual pixels may then be added to the motion compensated block of 16×16 pixels from the motion compensation block 134 to generate reconstructed pixels, which may be stored in the buffer 144. The reconstructed pixels may be stored in buffer 136 to be used, for example, to process subsequent video frames.

FIG. 2 is an exemplary block diagram of a portion of a video coder, in accordance with an embodiment of the invention. Referring to FIG. 2, there is shown the video coder block 210 and a memory block 220. The functionality of the video coder block 210 may be similar to the functionality of the video coder block 112*a*, and the functionality of the memory block 220 may be similar to the functionality of the memory block 116. There is also shown a coarse motion estimation (CME) block 212 and a fine motion estimation (FME) block 214 as part of the video coder block 210. The fine motion estimation block 214 may also be referred to as a fine motion estimator.

The CME block 212 may comprise suitable logic, circuitry, and/or code that may enable execution of motion estimation in, for example, a reduced resolution pixel grid, such as, for example, a double-pixel grid horizontally and vertically. The specific resolution of the pixel grid may be design dependent. Accordingly, a number of reduced resolution pixels may be reduced by a factor of 4 for a double-pixel grid in the horizontal and vertical directions. The CME block 212 may generate, for each block of pixels, one or more coarse motion vectors (CMVs) and their confidences. A motion vector confidence metric may be a predictor for a quality of the motion vector. The confidence may be directly proportional to a probability that the generated motion vector actually depicts real translational motion of the block of pixels. For example, confidence may be high for a unique type of pixel block where the video coder block 210 generates few, if any other, motion estimations with similar cost in a target search area of a picture. Conversely, confidence for a motion vector may be low where many different motion vectors with similar cost may be generated for a pixel block in a target search area of a picture. Low and/or high confidences may be defined with respect to a fixed reference value or to an adaptive or variable reference value.

The FME block 214 may comprise suitable logic, circuitry, and or code that may be enabled to make motion estimation in an integer or sub-pixel grid and provide the final motion vectors, the partition decision, and the reference frame index to the Motion Compensation (MC) module. The specific resolution of the pixel grid used by the FME block 214 may be design dependent. The FME block 214 may generate for each block of video pixels one or more fine motion vectors (FMVs) and their confidences. The output of the FME block 214 may be used by the video coder block 210 in generating compressed video data.

In operation, video data may be received by the CME block 212. The CME block 212 may generate CMVs and corresponding confidences for the CMVs. A CMV may be generated for each block of pixels by searching for a similar block of pixels in a temporally adjacent picture. Accordingly, reducing pixel resolution of a search area may allow faster searches, which reduces processing load and memory bandwidth. However, since the resolution is reduced, the accuracy of the CMVs may also be reduced. Accordingly, the CMVs and their confidences may be used to conduct another search using a new search area pointed to by the CMVs, where the new search area may have a finer resolution.

The CMVs and their confidences may be communicated to the FME block 214 by the CME block 212. The FME block 214 may use the CMVs and their confidences to generate fine motion vectors, which may be used for generating compressed video. The FME block 214 may use, for example, the CMV confidences to generate a patch list. The patch list may comprise, for example, an ordered list of video blocks that may be searched for generation of fine motion vectors. A patch may comprise, for example, a video block of 22 pixels by 22 pixels.

The coder block 210 may use, for example, video data stored in the memory block 220, and also store processed video data in the memory block 220. For example, the CME block 212 may use video data in the memory block 220 to generate the CMVs and their confidences. Similarly, the FME 214 may use the video data in the memory block 220 to perform further searches based on the CMVs and the confidences generated by the CME block 212. Accordingly, the patch list generated by the FME 214 may indicate which video data to use from the memory block 220. The use of patch list for generating fine motion vectors is further discussed with respect to FIGS. 3-9C.

Figure 3:
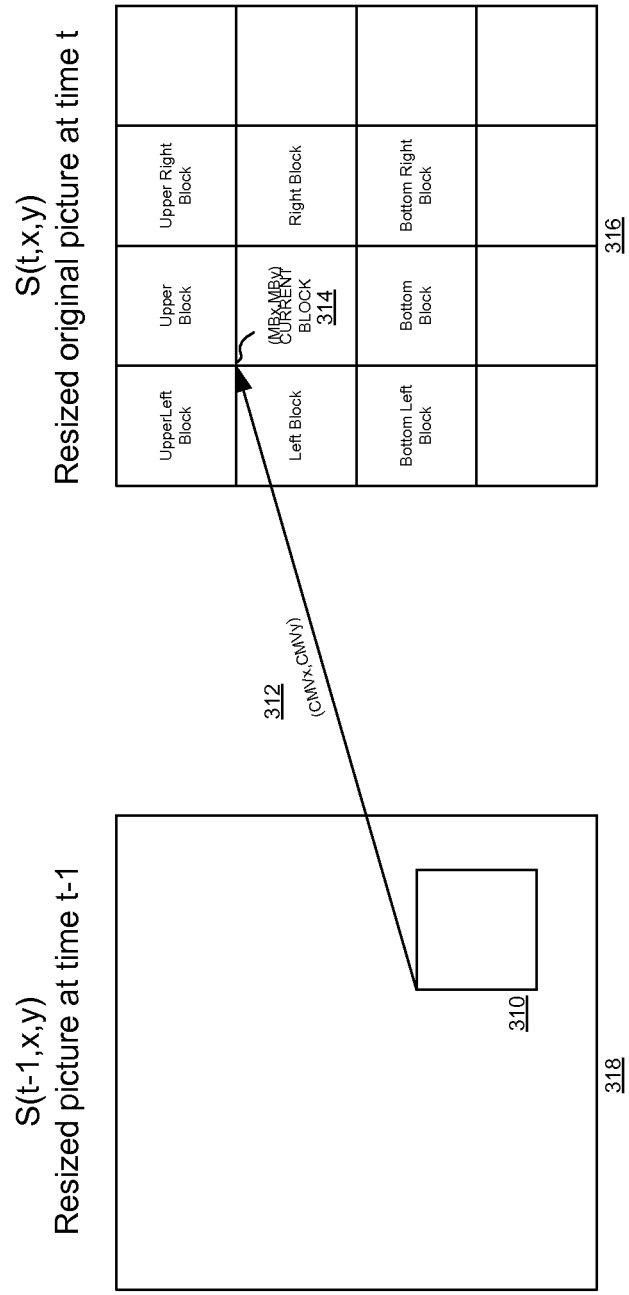
FIG. 3 is a diagram illustrating coarse motion estimation, in accordance with an embodiment of the invention.

FIG. 3 is a diagram illustrating coarse motion estimation, in accordance with an embodiment of the invention. Referring to FIG. 3, there are shown lower-resolution pictures 316 and 318, where the picture 316 may be a present picture $P_T$ and picture 318 may be a previous picture $P_{T-1}$. A translation vector 312 may comprise, for example, CMV components $CMV_x$ and $CMV_y$, which may correspond to motion for a macroblock from the video block position 310 in the picture 318 to the video block position 314 in the picture 318. The CMV components $CMV_x$ and $CMV_y$ may be generated by, for example, the CME block 212.

Various embodiments of the invention may generate a CMV with the coarse motion vector components $CMV_x$ and $CMV_y$ using the following algorithm:

$$(CMVx, CMVy,) = \operatorname{argmin}_{MVx, MVy} \sum_{i=0}^{7} \sum_{j=0}^{7} d(S(T, MBx+i, MBy+j), S(T-1, MBx+MVx+i, MBy+MVy+j)) \quad (1)$$

where $d(x, y)=(x-y)^2$. The parameter $d(x, y)$ may also be expressed by other distortion functions.

The variables T and T−1 may refer to present picture $P_T$ and previous picture $P_{T-1}$; MBx and MBy may refer to macroblock positions; i and j may refer to pixel positions in a macroblock; and MVx and MVy may refer to motion vectors from a macroblock in a previous picture to a corresponding macroblock in a present picture. The variables i and j may refer to pixel positions in a macroblock. If a macroblock is re-sized to a lower resolution, the number of pixels in the x and y directions may be reduced. For example, if quarter-resolution resizing is used for a macroblock with an initial full resolution of 16 pixels by 16 pixels, the variables i and j may range from 0 to 7.

The CME block 212 may process temporally adjacent video pictures to generate, for example, CMVs for video blocks in a present picture $P_T$ with respect to video blocks in a previous picture $P_{T-1}$ and/or a future picture $P_{T+1}$. The CME block 212 may use, for example, a search range that may comprise the entire video picture 316, or a portion of the video picture 316 about the video block for which the search is being made.

In instances when a double-pixel grid in the horizontal and vertical directions are used, the video block position 314 may correspond to, for example, a quarter-resolution video block in the present picture $P_T$ for which a motion vector may be desired, where the motion vector may be with respect to a previous picture $P_{T-1}$. The video block position 310 may correspond to, for example, a quarter-resolution video block in the previous picture $P_{T-1}$ that may be determined to best match the video block in the quarter-resolution video block position 314.

Accordingly, a CMV may be generated for the video block in the video block position 314 that may correspond to the motion from the quarter-resolution video block position 310. In addition to the CMV, a confidence level, which may be a measure of the probability that the CMV may be accurate, may be generated. The CMVs and the confidence for each motion vector for the video blocks in the present picture may be communicated to the FME block 214. The FME block 214 may then use the CMVs and their confidences to generate a patch list of video blocks to use in generating fine motion vectors. Confidence generation is explained in more detail with respect to FIGS. 4-9C.

Figure 4:
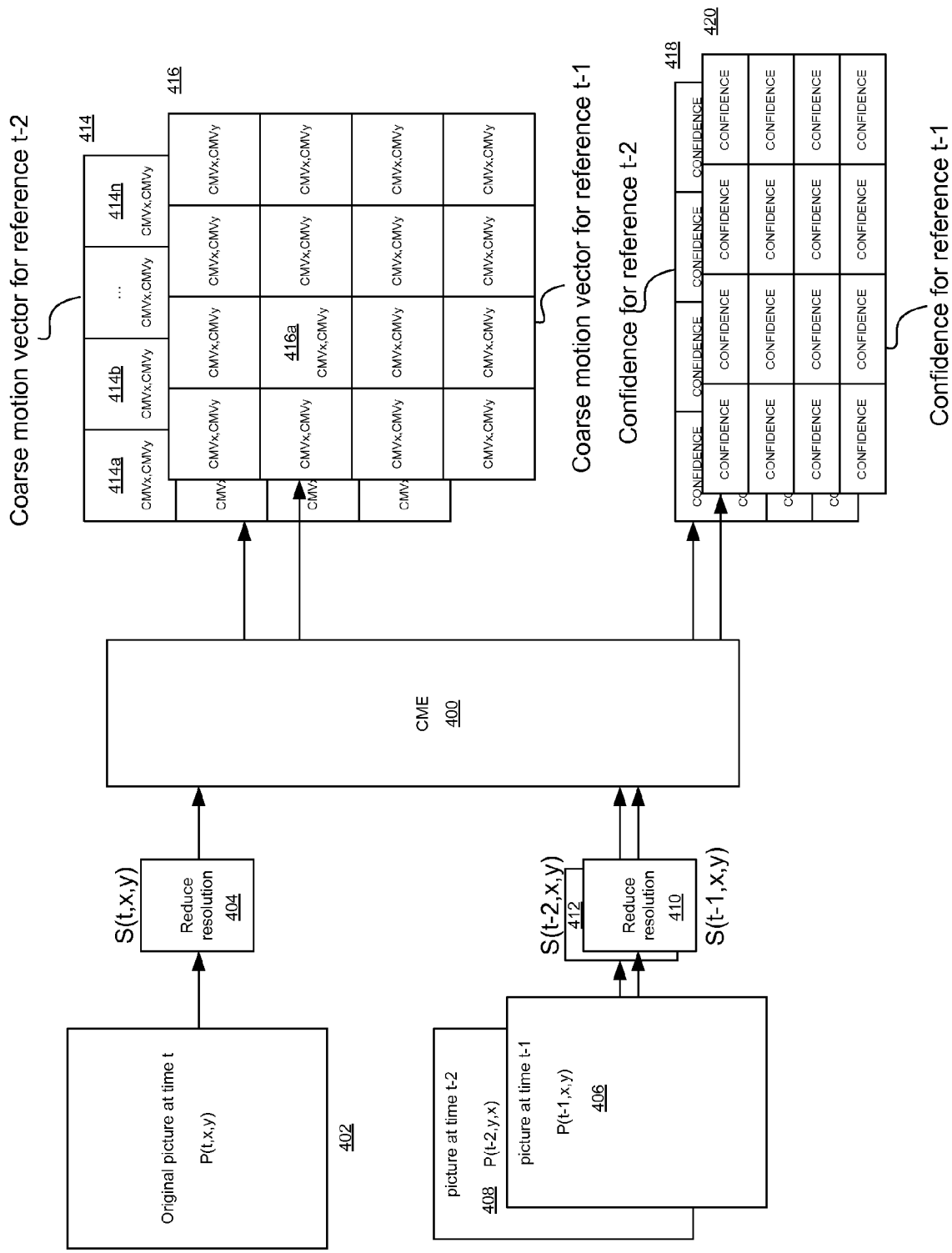
FIG. 4 is a diagram further illustrating coarse motion estimation, in accordance with an embodiment of the invention.

FIG. 4 is a diagram further illustrating coarse motion estimation, in accordance with an embodiment of the invention.

Referring to FIG. 4, there are shown a coarse motion estimator block 400, picture buffers 402, 406, and 408, resolution reduction blocks 404, 410, and 412, coarse motion vector buffers 414 and 416, and confidence buffers 418 and 420. The coarse motion estimator block 400 may be similar to, for example, the CME block 212.

The picture buffers 402, 406, and 408 may comprise memory that may be enabled to store data associated with a picture. For example, the picture buffer 402 may store data that correspond to the present picture $P_T$, where the present picture $P_T$ may be an original picture. Similarly, the picture buffers 406 and 408 may store data associated with reconstructed reference pictures $P'_{T-1}$ and $P'_{T-2}$, respectively. The reconstructed reference picture $P'_{T-1}$ may be a reconstructed picture previous to the present picture $P_T$ and the reconstructed reference picture $P'_{T-2}$ may be a reconstructed picture previous to the $P'_{T-1}$.

The resolution reduction blocks 404, 410, and 412 may comprise logic, circuitry, and/or code that may reduce resolution for a picture. For example, the resolution reduction blocks 404, 410, and 412 may reduce resolution by one-half of the pixels in the horizontal and/or vertical dimensions. The specific resolution reduction may vary under control of, for example, the processor 114 and/or the image processor 112. Resolution reduction may depend on, for example, complexity of a picture and/or video processing bandwidth available to the mobile terminal 100. Various embodiments of the invention may also set the resolution reduction to a constant value.

The coarse motion vector buffers 414 and 416 may comprise memory that may enabled to store CMVs for the reconstructed reference pictures $P'_{T-1}$ and $P'_{T-2}$, respectively. For example, a CMV may be stored for the video block position 414a in the coarse motion vector buffer 414 that may correspond to translation of a macroblock from the reconstructed reference picture $P'_{T-2}$ to the video block position 414a in the present picture $P_T$. Accordingly, each motion vector for the video block positions 414a, 414b, . . . , 414n may describe translation for a macroblock from the reconstructed reference picture $P'_{T-2}$ to the present picture $P_T$. Similarly, the coarse motion vector buffer 416 may store CMVs that describe translation for corresponding macroblocks from the reconstructed reference picture $P'_{T-1}$ to the present picture $P_T$.

For example, the video block position 416a may correspond to the video block position 314 (FIG. 3) in the present picture $P_T$. Accordingly, the CMV 312 that describes translation of a macroblock from the video block position 310 in the reconstructed reference picture $P'_{T-1}$ to the video block position in the present picture 316 may be stored in a buffer location that corresponds to the video block position 416a.

The confidence buffers 418 and 420 may comprise memory that may be enabled to store a corresponding confidence level for each CMV in the coarse motion vector buffers 414 and 416.

In operation, the present picture $P_T$ may be stored in the picture buffer 402. Accordingly, the picture buffer 402 may be similar to the buffer 130. A previous picture, for example, which may be reconstructed as described with respect to FIG. 2, may be stored in the picture buffer 406 and/or 408. The picture buffers 406 and 408 may be similar to, for example, the buffer 136. The resolution reduction blocks 404, 410, and 412 may reduce resolution of the pictures in the picture buffers 402, 406, and 408, respectively. The reduced resolution pictures from the resolution reduction blocks 404, 410, and 412 may be communicated to the coarse motion estimator block 400.

The coarse motion estimator block 400 may generate CMVs for the macroblocks in the present picture with respect to the reconstructed reference picture $P'_{T-1}$ and the reconstructed reference picture $P'_{T-2}$. The CMVs may be stored in the coarse motion vector buffers 414 and 416. The coarse motion estimator block 400 may also generate a confidence level for each of the CMVs in the coarse motion vector buffers 414 and 416. The confidence levels may be stored in the confidence buffers 418 and 420.

While an embodiment of the invention may have been described with respect to FIG. 4, the invention need not be so limited. For example, the number of reference pictures used may be different than two.

Figure 5:
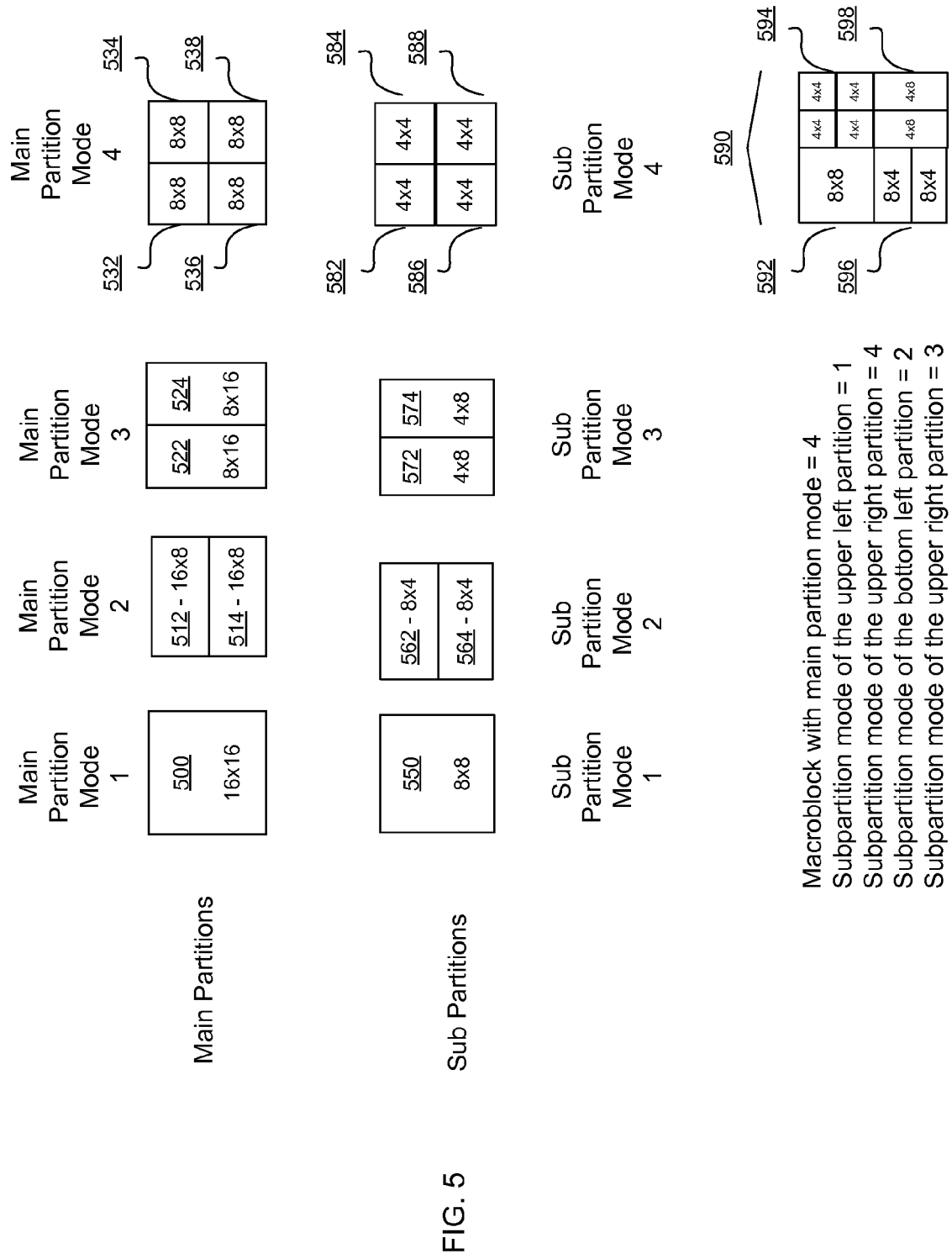
FIG. 5 is a diagram illustrating various partition modes, in accordance with an embodiment of the invention.

FIG. 5 comprises diagrams illustrating exemplary patch modes, in accordance with an embodiment of the invention. Referring to FIG. 5, there are shown various partitions of a macroblock 500 comprising, for example, 16 pixels by 16 pixels. There may be, for example, a main partition mode 1 that comprises a single partition for a macroblock. There may be a main partition mode 2 that may comprise two partitions 512 and 514 where each partition may comprise, for example, 16 pixels in the horizontal direction and 8 pixels in the vertical direction. There may also be a main partition mode 3 that may comprise two partitions 522 and 524 where each partition may comprise, for example, 8 pixels in the horizontal direction and 16 pixels in the vertical direction. There may be a main partition mode 4 that may comprise four partitions 532, 534, 536, and 538 where each partition may comprise, for example, 8 pixels in the horizontal direction and 8 pixels in the vertical direction.

There may also be sub-partition mode 1, a sub-partition mode 2, a sub-partition mode 3, and a sub-partition mode 4. The sub-partition modes 1-4 may be similar to the main partition modes 1-4, however, the sub-partition modes 1-4 may be with respect to a partition that is 8 pixels by 8 pixels, such as, for example, one of the partitions 532, 534, 536, and 538. Accordingly, the sub-partition mode 1 may comprise a single sub-partition 550 that is 8 pixels by 8 pixels. The sub-partition mode 2 may comprise two sub-partitions 562 and 564 where each partition may comprise, for example, 8 pixels in the horizontal direction and 4 pixels in the vertical direction. The sub-partition mode 3 may comprise two sub-partitions 572 and 574 where each partition may comprise, for example, 4 pixels in the horizontal direction and 8 pixels in the vertical direction. The sub-partition mode 4 may comprise four sub-partitions 582, 584, 586, and 588 where each partition may comprise, for example, 4 pixels in the horizontal direction and 4 pixels in the vertical direction.

For the main partition mode 1, comprising the macroblock 500, there may be a single motion vector associated with the macroblock 500. However, where there may be multiple partitions and sub-partitions for a macroblock, there may be multiple motion vectors for the macroblock, where each motion vector may correspond to each partition and/or sub-partition. For example, for the main partition mode 2, there may be a motion vector for each of the partitions 512 and 514. Similarly, for the main partition mode 3, there may be a motion vector for each of the partitions 522 and 524. The main partition mode 4 may also have a motion vector that corresponds to each of the partitions 532, 534, 536, and 538.

Additionally, where a partition in the main partition mode 4 may be sub-divided to sub-partitions, the partition may not have a corresponding motion vector, but each of the sub-partitions may have a corresponding motion vector. Accordingly, for the sub-partition mode 1, comprising the partition 550, there may be a single motion vector associated with the sub-partition 550. Accordingly, for the sub-partition mode 2, there may be a motion vector for each of the sub-partitions 562 and 564. Similarly, for the sub-partition mode 3, there may be a motion vector for each of the sub-partitions 572 and 574. The sub-partition mode 4 may also have a motion vector that corresponds to each of the sub-partitions 582, 584, 586, and 588.

There is shown a macroblock 590 that may have associated with it a main partition mode 4. Each of the four partitions may the then have associated with it a sub-partition mode. For example, the top left-hand partition may be associated with the sub-partition mode 1, the top-right hand partition may be associated with sub-partition the mode 4, the bottom left-hand partition may be associated with the sub-partition mode 2, and the bottom right-hand partition may be associated with the sub-partition mode 3. Accordingly, the macroblock 590 may have associated with it nine motion vectors.

Although a specific variation of portioning modes and sub-portioning modes has been described, various embodiments of the invention may use different types of partitioning, and various levels of sub-partitioning. The partitioning and/or sub-partitioning may comprise, for example, shapes other than squares or rectangles. There may also be other number of modes than 4 types of partitioning modes and 4 types of sub-partition modes. Additionally, there may be, for example, more than one level of sub-partitioning.

Figure 6:
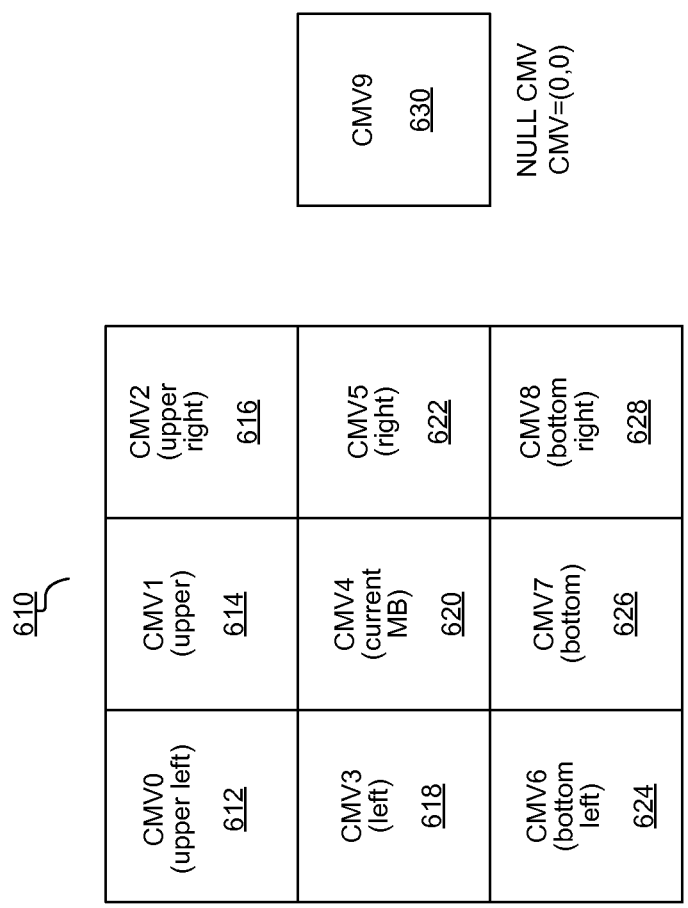
FIG. 6 is an exemplary diagram illustrating coarse motion vectors used for generation of fine motion vectors, in accordance with an embodiment of the invention.

FIG. 6 is an exemplary diagram illustrating coarse motion vectors used for generation of fine motion vectors, in accordance with an embodiment of the invention. Referring to FIG. 6, there is shown a search region 610 that may be used by the FME block 214 to generate a more accurate motion vector, based on the CMVs and their confidences generated by the CME block 212. The search region 610 may comprise, for example, the macroblock being processed, and eight neighboring macroblocks.

For example, if the current macroblock is the center macroblock 620 of the search region 610, the additional macroblocks in the search region 610 may comprise the macroblocks 612, 614, 616, 618, 622, 624, 626, and 628. The center macroblock 620 may be associated with CMV4. The macroblock 612, which may be the above and left of the center macroblock 620, may be associated with CMV0. The macroblock 614, which may be the directly above the center macroblock 620, may be associated with CMV1. The macroblock 616, which may be above and to the right of the center macroblock 620, may be associated with CMV2.

The macroblock 618, which may to the left of the center macroblock 620, may be associated with CMV3. The macroblock 622, which may be to the right of the center macroblock 620, may be associated with CMV5.

The macroblock 624, which may be below and to the left of the center macroblock 620, may be associated with CMV6. The macroblock 626, which may be directly below the center macroblock 620, may be associated with CMV7. The macroblock 628, which may be below and to the right of the center macroblock 620, may be associated with CMV8. There may also be a CMV9 that may be associated with a null coarse motion vector, or zero translation motion.

Generally, the CMV associated with a macroblock may be a best match for motion translation from a previous picture. However, in cases where there may have been zoom rotation, the CMV may not be the most optimal. Furthermore, since the CME block 212 may not have used full resolution in determining the motion vector, the FME block 214 may make a further search in an area around the video block position 320. The additional search by the FME block 214 may be at a picture resolution greater than the picture resolution used by the CME block 212.

The FME block 214 may further refine the search area by, for example, considering the confidences of the motion vectors associated with the video blocks in these video block positions. The video blocks associated with those motion vectors whose confidences are higher than a threshold confidence may then be searched for a better match. Accordingly, the number of video blocks searched may be reduced by not searching those video blocks with lower confidences. This may allow a better use of processing and memory resources. If none of the confidences in a search area are greater than a minimum confidence level, then the null coarse motion vector CMV9 may be assigned as a default to the current macroblock being processed. Accordingly, the FME 214 may use up to 10 CMVs to determine a fine motion vector for a macroblock.

Figure 7A:
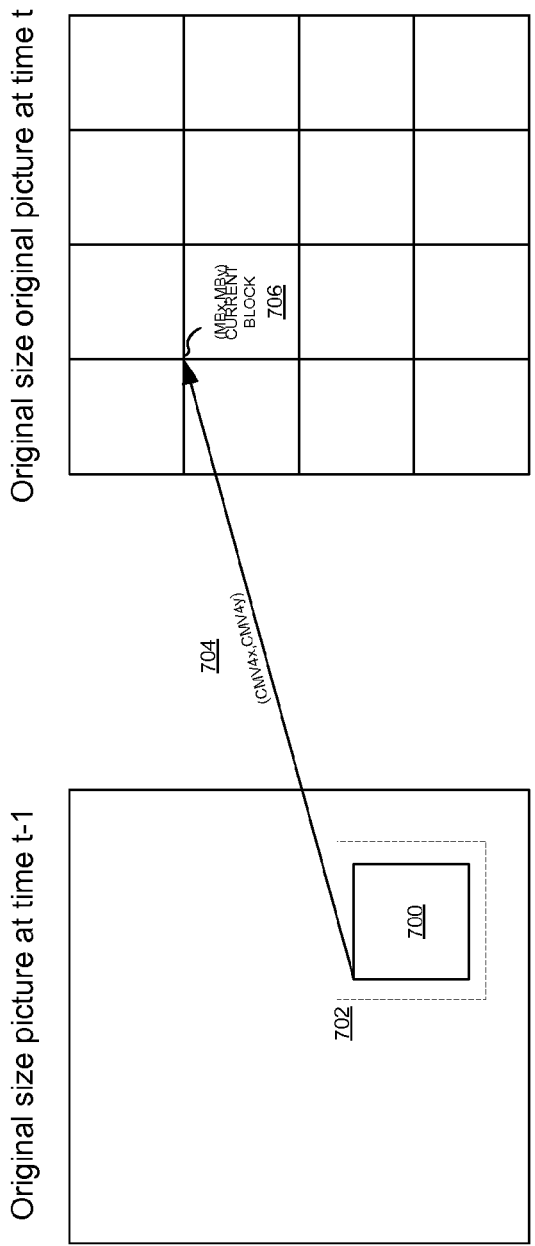
FIG. 7A is an exemplary diagram illustrating use of coarse motion vector of a macroblock for generation of fine motion vectors, in accordance with an embodiment of the invention.

FIG. 7A is an exemplary diagram illustrating use of coarse motion vector of a macroblock for generation of fine motion vectors, in accordance with an embodiment of the invention. Referring to FIG. 7A, there is shown a macroblock 706 in the present picture $P_T$ that is being processed. The coarse motion vector 704 may describe the translation motion for the macroblock 706 with respect to the macroblock 700 in a reference picture $P_{T-1}$. The FME 214, for example, may select a 16 pixel by 16 pixel macroblock from, for example, a video patch 702 that may comprise 22 pixels by 22 pixels. Accordingly, a comprehensive search for the 16 pixel by 16 pixel macroblock 700 may comprise considering 49 distinct macroblocks within the video patch 702.

The translation motion for the macroblock 706 may be described by the single CMV 704, where the macroblock 706 may be associated with the main partition mode 1. For exemplary purposes, the CMV 704 may comprise components $CMV_{4x}$ and $CMV_{4y}$, where the subscript "4" may indicate that the CMV for the center macroblock in the search area used is the most likely motion vector.

Figure 7B:
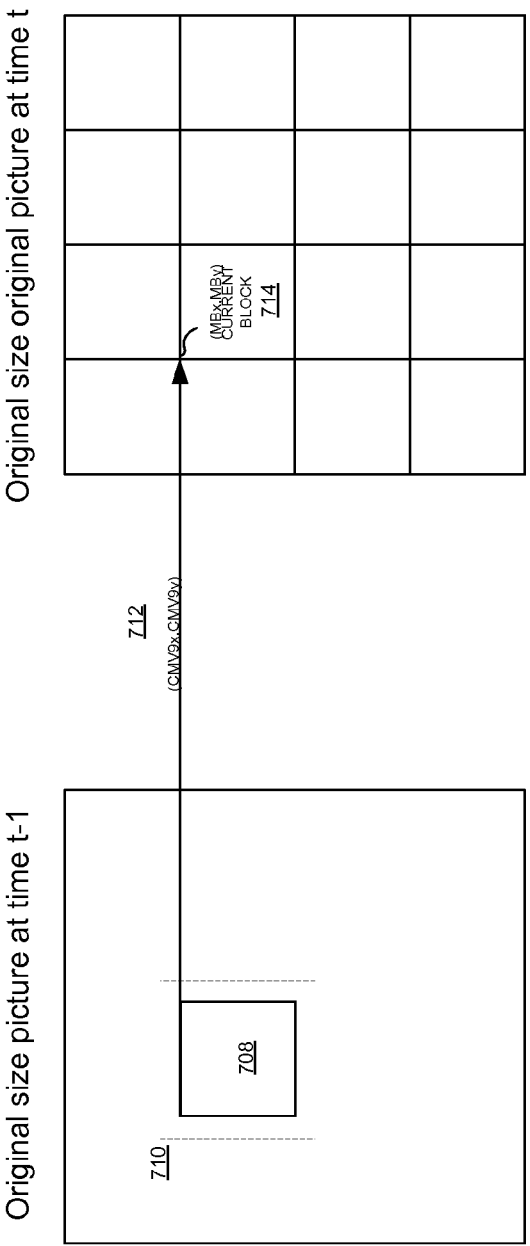
FIG. 7B is an exemplary diagram illustrating use of null coarse motion vector for a macroblock for generation of fine motion vectors, in accordance with an embodiment of the invention.

FIG. 7B is an exemplary diagram illustrating use of null coarse motion vector for a macroblock for generation of fine motion vectors, in accordance with an embodiment of the invention. Referring to FIG. 7B, there is shown a macroblock 714 in the present picture $P_T$ that is being processed. The null coarse motion vector 712 may denote zero translation for the macroblock 714 with respect to the previous reference picture $P_{T-1}$. The corresponding macroblock in the previous reference picture $P_{T-1}$ may be the macroblock 708. The FME 214, for example, may select a 16 pixel by 16 pixel macroblock from, for example, a video patch 710 that may comprise 22 pixels by 22 pixels. Accordingly, a comprehensive search for the 16 pixel by 16 pixel macroblock 708 may comprise considering 49 distinct macroblocks within the video patch 710.

The translation motion for the macroblock 714 may be described by the single CMV 712, where the macroblock 706 may be associated with the main partition mode 1. For exemplary purposes, the CMV 712 may comprise components $CMV_{9x}$ and $CMV_{9y}$, where the subscript "9" may indicate that the null coarse motion vector is the most likely motion vector.

Figure 7C:
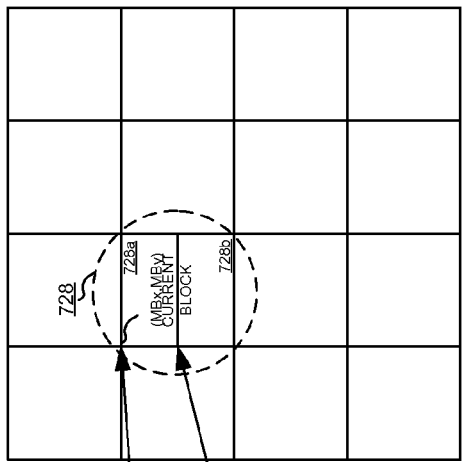
FIG. 7C is an exemplary diagram illustrating use of coarse motion vectors for various partitions for generation of fine motion vectors, in accordance with an embodiment of the invention.

FIG. 7C is an exemplary diagram illustrating use of coarse motion vectors for various partitions for generation of fine motion vectors, in accordance with an embodiment of the invention. Referring to FIG. 7C, there is shown a macroblock 728 in the present picture $P_T$ that is being processed. The macroblock 728 may be associated with the main partition mode 2. Accordingly, the macroblock 728 may comprise partitions 728a and 728b. The coarse motion vector 720 may describe the translation motion for the partition 728a with respect to a corresponding video block 716 in a reference picture $P_{T-1}$. The FME 214, for example, may select a 16 pixel by 8 pixel video block from, for example, a video patch 718 that may comprise 22 pixels by 14 pixels. Accordingly, a comprehensive search for the 16 pixel by 8 pixel video block 716 may comprise considering 49 distinct video blocks within the video patch 718.

Similarly, the coarse motion vector 726 may describe the translation motion for the partition 728b with respect to a corresponding video block 722 in the reference picture $P_{T-1}$. The FME 214, for example, may select a 16 pixel by 8 pixel video block from, for example, a video patch 724 that may comprise 22 pixels by 14 pixels. Accordingly, a comprehensive search for the 16 pixel by 8 pixel video block 722 may comprise considering 49 distinct video blocks within the video patch 724.

Accordingly, the translation motion for the macroblock 728 may be described by the CMVs 720 and 726, where the macroblock 728 may be associated with the main partition mode 2. For exemplary purposes, the CMV 720 may comprise components $CMV_{1x}$ and $CMV_{1y}$, where the subscript "1" may indicate that the CMV for the video block 716 in a macroblock above the center macroblock in the search area used is the most likely motion vector.

Similarly, the CMV may comprise components $CMV_{7x}$ and $CMV_{7y}$, where the subscript "7" may indicate that the CMV for the video block 722 in the macroblock below the center macroblock in the search area used is the most likely motion vector.

Figure 7D:
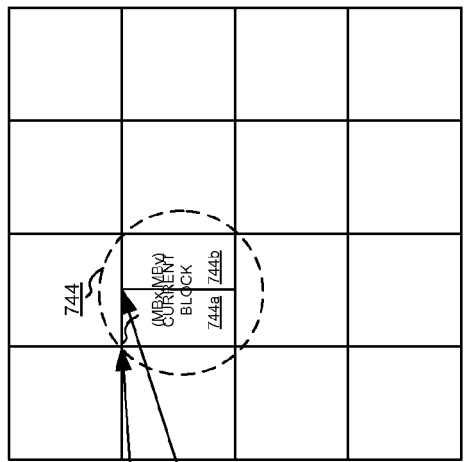
FIG. 7D is an exemplary diagram illustrating use of coarse motion vectors for partitions for generation of fine motion vectors, in accordance with an embodiment of the invention.

FIG. 7D is an exemplary diagram illustrating use of coarse motion vectors for partitions for generation of fine motion vectors, in accordance with an embodiment of the invention. Referring to FIG. 7D, there is shown a macroblock 744 in the present picture $P_T$ that is being processed. The macroblock 744 may be associated with the main partition mode 3. Accordingly, the macroblock 744 may comprise partitions 744a and 744b. The coarse motion vector 736 may describe the translation motion for the partition 744a with respect to a corresponding video block 732 in a reference picture $P_{T-1}$. The FME 214, for example, may select a 8 pixel by 16 pixel video block from, for example, a video patch 734 that may comprise 14 pixels by 22 pixels. Accordingly, a comprehensive search for the 8 pixel by 16 pixel video block 732 may comprise considering 49 distinct video blocks within the video patch 734.

Similarly, the coarse motion vector 742 may describe the translation motion for the partition 744b with respect to a corresponding video block 738 in the reference picture $P_{T-1}$. The FME 214, for example, may select a 8 pixel by 16 pixel video block from, for example, a video patch 740 that may comprise 14 pixels by 22 pixels. Accordingly, a comprehensive search for the 8 pixel by 16 pixel video block 738 may comprise considering 49 distinct video blocks within the video patch 740.

Accordingly, the translation motion for the macroblock 744 may be described by the CMVs 736 and 742, where the macroblock 744 may be associated with the main partition mode 3. For exemplary purposes, the CMV 736 may comprise components $CMV_{3x}$ and $CMV_{3y}$, where the subscript "3" may indicate that the CMV for the video block 732 in the macroblock to the left of the center macroblock in the search area used is the most likely motion vector.

Similarly, the CMV 742 may comprise components $CMV_{5x}$ and $CMV_{5y}$, where the subscript "5" may indicate that the CMV for the video block 738 in the macroblock to the right of the center macroblock in the search area used is the most likely motion vector.

Figure 7E:
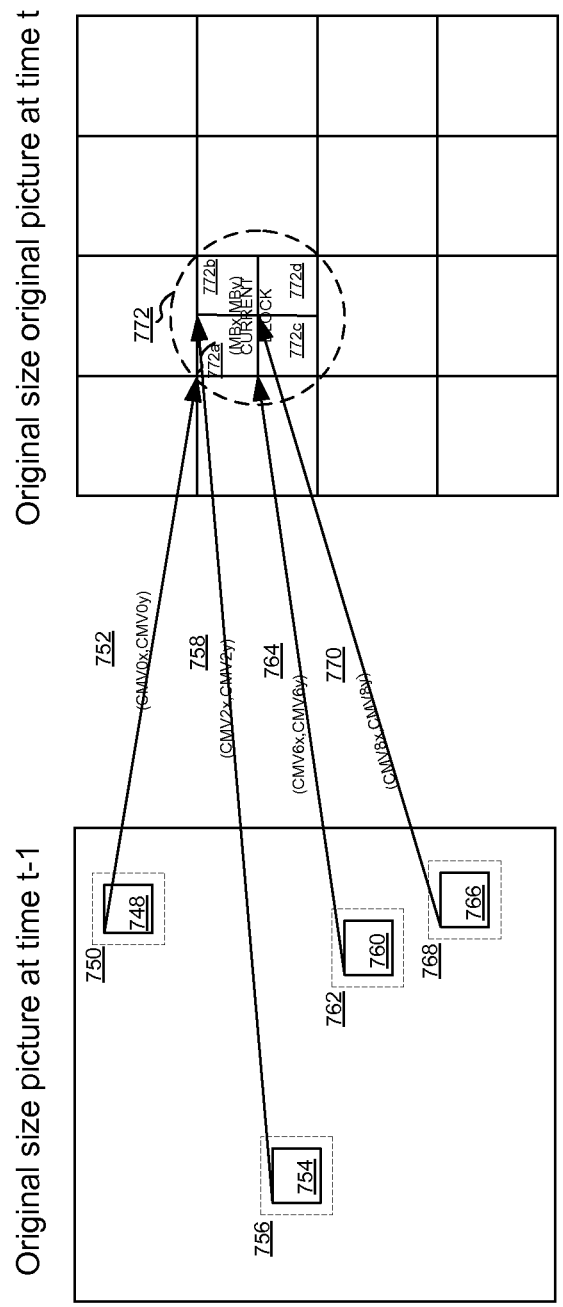
FIG. 7E is an exemplary diagram illustrating use of coarse motion vectors for partitions for generation of fine motion vectors, in accordance with an embodiment of the invention.

FIG. 7E is an exemplary diagram illustrating use of coarse motion vectors for partitions for generation of fine motion vectors, in accordance with an embodiment of the invention.

Referring to FIG. 7E, there is shown a macroblock 772 in the present picture $P_T$ that is being processed. The macroblock 772 may be associated with the main partition mode 4. Accordingly, the macroblock 772 may comprise partitions 772a, 772b, 772c, and 772d. The coarse motion vector 752 may describe the translation motion for the partition 772a with respect to a corresponding video block 748 in a reference picture $P_{T-1}$. The FME 214, for example, may select an 8 pixel by 8 pixel video block from, for example, a video patch 750 that may comprise 14 pixels by 14 pixels. Accordingly, a comprehensive search for the 8 pixel by 8 pixel video block 748 may comprise considering 49 distinct video blocks within the video patch 750.

Similarly, the coarse motion vectors 758, 764, and 770 may describe the translation motion for the partitions 772b, 772c, and 772d with respect to corresponding video blocks 754, 760, and 766, respectively, in the reference picture $P_{T-1}$. The FME 214, for example, may select 8 pixel by 8 pixel video blocks from, for example, video patches 756, 762, and 768, respectively, where each video patch may comprise 14 pixels by 14 pixels. Accordingly, a comprehensive search for an 8 pixel by 8 pixel video block 754, 760, and 766 may comprise considering 49 distinct video blocks within a corresponding video patch 756, 762, and 768, respectively.

Accordingly, the translation motion for the macroblock 772 may be described by the CMVs 752, 758, 764 and 770, where the macroblock 772 may be associated with the main partition mode 4. For exemplary purposes, the CMV 752 may comprise components $CMV_{0x}$ and $CMV_{0y}$, where the subscript 0" may indicate that the CMV for the video block 748 in the macroblock above and to the left of the center macroblock in the search area used is the most likely motion vector. Similarly, the CMV 758 may comprise components $CMV_{2x}$ and $CMV_{2y}$, where the subscript "2" may indicate that the CMV for the video block 754 in the macroblock above and to the right of the center macroblock in the search area used is the most likely motion vector.

The CMV 764 may comprise components $CMV_{6x}$ and $CMV_{6y}$, where the subscript "6" may indicate that the CMV for the video block 760 in the macroblock below and to the left of the center macroblock in the search area used is the most likely motion vector. CMV 770 may comprise components $CMV_{8x}$ and $CMV_{8y}$, where the subscript "8" may indicate that the CMV for the video block 766 in the macroblock below and to the right of the center macroblock in the search area used is the most likely motion vector.

FIG. 7F is an exemplary diagram illustrating generation of fine motion vectors, in accordance with an embodiment of the invention. Referring to FIG. 7F, there are shown a FMV buffer 782 and a FME search engine 780. The FMV buffer 782 may comprise suitable memory that may be used to store one or more motion vectors for each macroblock in the present picture $P_T$. The FMV buffer may also store, for example, the partition mode for each macroblock.

The FME search engine 780 may comprise suitable logic, circuitry, and/or code that may be used in determining a fine motion vector for a macroblock. The FME search engine 780 may be a part of, for example, the FME block 214.

The FME search engine 780 may receive, for example, the video patches 702, 710, 718, 724, 734, 740, 750, 756, 762, and 768 that correspond to the video blocks 700, 708, 716, 722, 732, 738, 748, 754, 760, and 766, respectively. The video patches communicated to the FME search engine 780 may be prioritized, for example, in the order they were requested from memory, where the video data with high confidence levels may have been requested first. The memory requests may have been made by, for example, the processor 114 and/or the image processor 112. Due to memory bandwidth limitations, all the video patches may not be read successfully from the memory. Accordingly, the video patches may be read according to priority.

The FME search engine 780 may search the video patches that were read successfully from the memory for the most likely video blocks, and may also determine which main partition mode and/or sub-partition mode may result in a best match with the macroblock in the present picture $P_T$. The number of different video patches searched may depend on available processing resources and/or available memory bandwidth and the number of patches that were read from the memory. The FME search engine 780 may then output partition modes and/or FMVs for the macroblocks of the present picture $P_T$. The partition modes and/or FMVs may be stored in the FMV buffer 782. The FME search engine 780 may be able to create partition mode and FMV even when only some of the patches are read from the memory. However, as more patches are received from the memory, a better FMV and partition mode may be found.

While an embodiment of the invention may have been described using a single reference, the previous picture $P_{T-1}$, the invention need not be so limited. For example, various embodiments of the invention may comprise two or more references. Accordingly, partitions and/or sub-partitions from a plurality of pictures may be used to determine the partition mode and the corresponding one or more FMVs for each macroblock in the present picture $P_T$.

Figure 8:
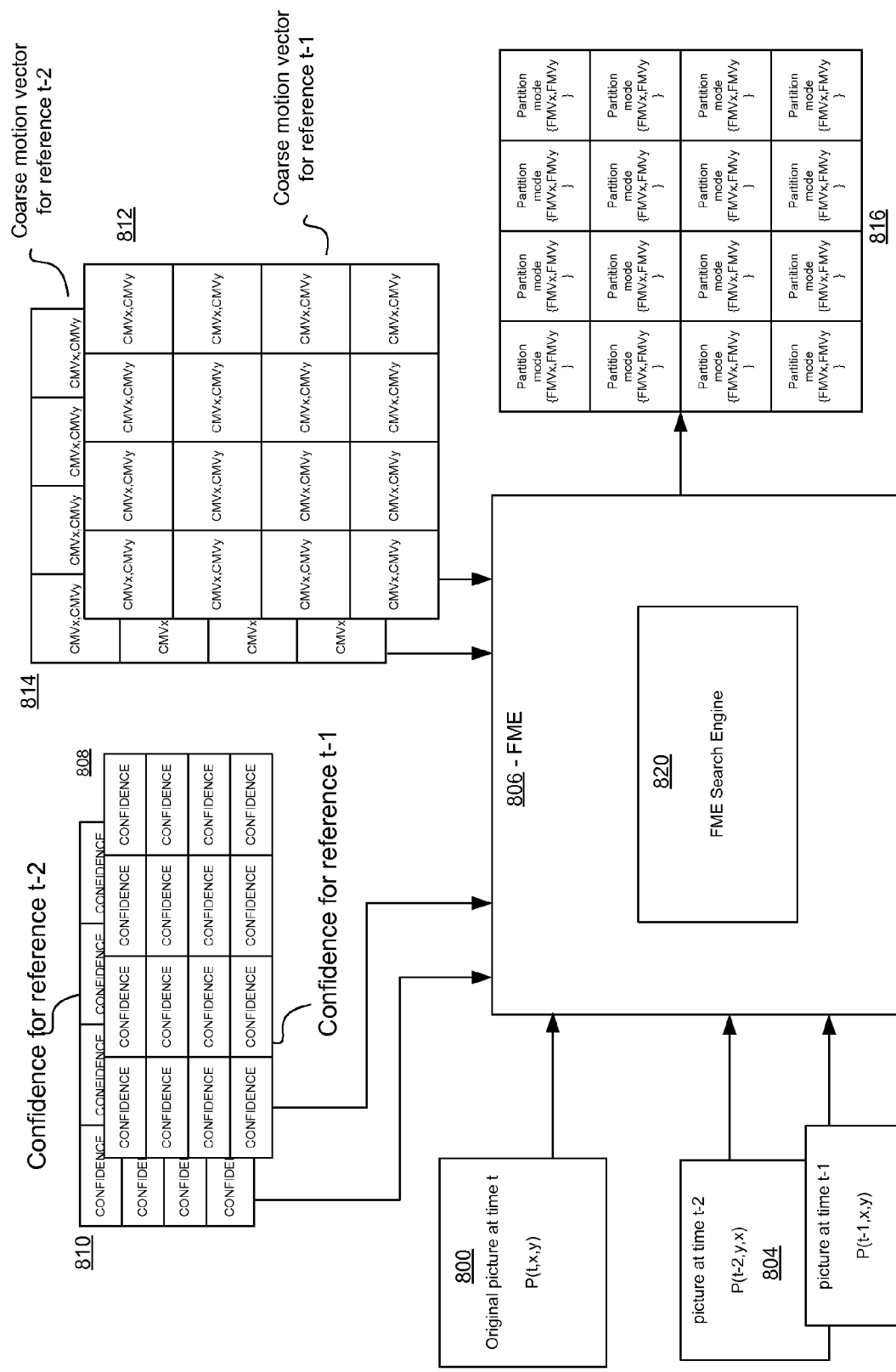
FIG. 8 is an exemplary diagram illustrating generation of fine motion vectors, in accordance with an embodiment of the invention.

FIG. 8 is an exemplary diagram illustrating generation of fine motion vectors, in accordance with an embodiment of the invention. Referring to FIG. 8, there are shown picture buffers 800, 802, and 804, confidence buffers 808 and 810, coarse motion vector buffers 812 and 814, the FME block 806, the FME search engine 820, and the FMV buffer 816.

The picture buffers 800, 802, and 804, the confidence buffers 808 and 810, and the coarse motion vector buffers 812 and 814 may be similar to corresponding devices described with respect to FIG. 4. The FME block 806 may be similar to the FME block 214 described with respect to FIG. 2. The FME search engine 820 and the FMV buffer 816 may be similar to the FME search engine 780 and the FMV buffer 782 described with respect to FIG. 7.

In operation, the FME block 806 may receive the present picture $P_T$ and the reference pictures $P_{T-1}$ and $P_{T-2}$. The FME block 806 may also receive corresponding CMVs for the macroblocks in the present picture $P_T$ with respect to the reference pictures $P_{T-1}$ and $P_{T-2}$. The FME block 806 may also receive confidence levels for the CMVs. The FME search engine 820 may then process the information as described with respect to FIGS. 4-7F, and the resulting partition modes and FMVs for the macroblocks in the present picture $P_T$ may be stored in the FMV buffer 816.

FIG. 9 is a diagram illustrating exemplary mapping of coarse motion vectors as video patches, in accordance with an embodiment of the invention. Referring to FIG. 9, there is shown a table 900 that shows exemplary association of patch IDs with CMVs for a search area, for example, the search area illustrated with respect to FIGS. 3-7F.

Table 900 may comprise patch ID groups 900a, 900b, 900c, 900d, and 900e. Patch ID group 900a may comprise patch ID 0 that may correspond to a null CMV, the CMV9, and the main partition mode 1. Patch ID group 900b may comprise patch ID 1 that may correspond to a current CMV, the CMV4, and the main partition mode 1. Patch ID group 900c may comprise patch IDs 2 and 3 that may correspond to the upper and lower CMVs, the CMV1 and CMV7, respectively, and the main partition mode 2.

Patch ID group 900d may comprise patch IDs 4 and 5 that may correspond to the left and right CMVs, the CMV3 and CMV5, respectively, and the main partition mode 3. Patch ID group 900e may comprise patch IDs 6, 7, 8, and 9 that may correspond to the upper left, upper right, lower left, and lower right CMVs, the CMV0, CMV 2, CMV6, and CMV8, respectively, and the main partition mode 4.

The patch IDs may be used to indicate the video patches that may be requested from memory. All patch IDs in a patch ID group may be requested together. Accordingly, if a macroblock is to be processed as a main partition mode 2, 3, and/or 4, then all patch IDs that correspond to a mode may be requested together. For example, patch ID group 900c may correspond to main partition mode 2. Accordingly, in this exemplary case, a request for video patches that correspond to patch IDs 2 and 3 may be communicated to memory that may hold the requested data.

Similarly, patch ID group 900d may correspond to main partition mode 3. Accordingly, in this exemplary case, a request for video patches that correspond to patch IDs 4 and 5 may be communicated to memory that may hold the requested data. In a like manner, patch ID group 900e may correspond to main partition mode 4. Accordingly, in this exemplary case, a request for video patches that correspond to patch IDs 6, 7, 8, and 9 may be communicated to memory that may hold the requested data. The video patches may be sorted by confidence levels, and requested in order.

FIG. 9A is a diagram illustrating an exemplary priority list of patches, in accordance with an embodiment of the invention. Referring to FIG. 9A, there is shown an exemplary priority ordered patch list 906 comprising entries 906a . . . 906t. Each of the entries 906a . . . 906t may a patch ID, a reference picture index, whether the video information is luma or chroma, and whether the video patch is required or optional.

The ordered patch list 906 may show an exemplary prioritization where luma video patches may have a higher priority than chroma video patches. Furthermore, the luma and chroma video patches may be prioritized as shown with respect to FIG. 9. That is, patch ID 0 may have top priority, then patch ID 1, etc, to patch ID 9. All of the video patches may be with respect to "ref0," which may be, for example, the previous picture $P_{T-1}$. Other values may be used to indicate reference pictures other than the previous picture $P_{T-1}$.

Additionally, the entry 906a may be marked as "required" while the other entries may be marked as "optional." Accordingly, the video patch associated with the entry 906a will be communicated to the FME block 806, while the other video patches associated with the other entries 906b . . . 906t may be communicated to the FME block 806 as resources allow. The resources may comprise, for example, processing resources and/or memory bandwidth availability. Accordingly, as more resources become available, FMV generation may execute more searches using more video patches than the required video patch.

The number of entries which are indicated to be required may be set to a default value. Various embodiments of the invention may allow the number of required entries to be changed dynamically depending on, for example, availability of processing and/or memory resources. These changes may be made, for example, by the processor 114 and/or the image processor 112.

The processor 114 and/or the image processor 112 may also determine, for example, how many entries to use for a search area. Accordingly, if the number of entries to use for a search area is larger than the number of required entries, the optional entries immediately below the required entries may be included for the search area until the total number of required entries and optional entries equals the number of entries to use for the search area. A number of entries to use for the search area that is less than the number of required entries may default to using all of the required entries.

For example, a default value for the required entries may be 4, and a number of entries to use for a search area may also be 4. Accordingly, the patches 906a, 906b, 906c, and 906d may be the target search area for the FME block 806. If the number of entries to use for a search area is 6, then the patches 906e and 906f may also be included in the target search area for the FME block 806. Accordingly, the higher an optional entry is in the priority ordered patch list 906, the more likely the video patch associated with that entry may be a part of the target search area if optional video patches are to be included in a search area.

Figure 9B:
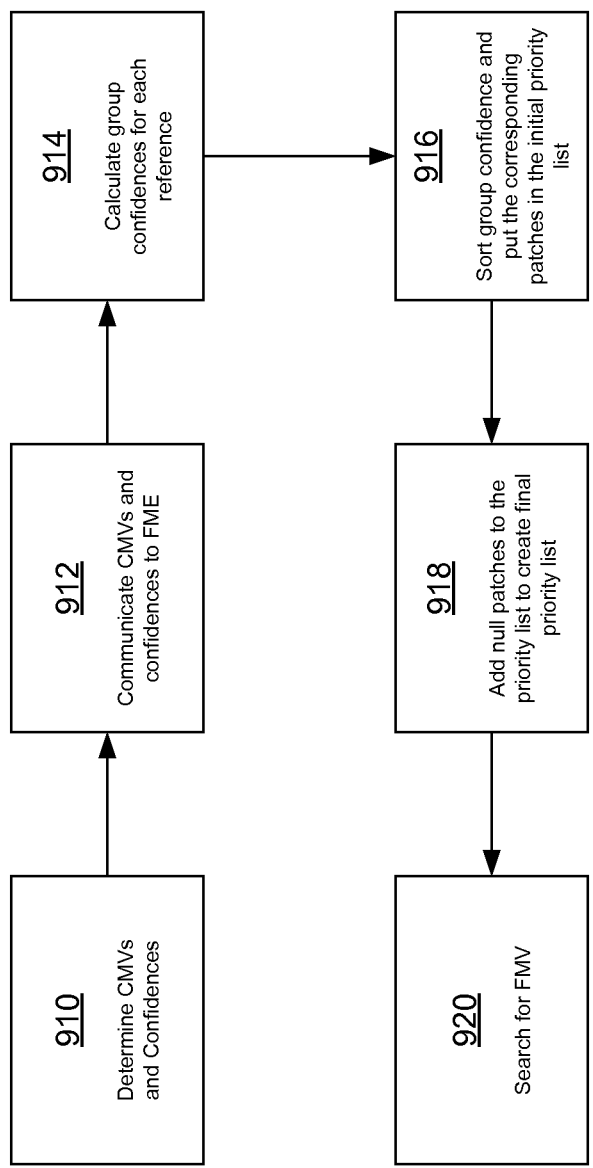
FIG. 9B is a flow diagram illustrating exemplary steps for using motion vector confidence to determine a fine motion estimation patch priority list for a scalable coder, in accordance with an embodiment of the invention.

FIG. 9B is a flow diagram illustrating exemplary steps for using motion vector confidence to determine a fine motion estimation patch priority list for a scalable coder, in accordance with an embodiment of the invention. Referring to FIG. 9B, there are shown steps 910 to 920. In step 900, CMVs may be generated for a plurality of video blocks in a present picture by the CME block 212. The CMVs may be generated for a picture that has a reduced resolution. Accordingly, less processing time may be needed to generate the CMVs. The CMVs may refer to one or more reference pictures, where a reference picture may be a temporally previous picture or a temporally future picture.

In step 912, the CMVs may be communicated to the FME block 214, which may be enabled to generate a final motion vector at pixel or sub-pixel resolution. The resolution for the motion vectors generated by the FME block 214 may be controlled by, for example, the processor 114 and/or the image processor 112.

In step 914, the FME block 214 may process the CMVs to a target video block and to video blocks surrounding the target video block. For example, the CME block 212 may have generated a CMV 312 for the video block in the video block position 314 in the present picture $P_T$. The CMV 312 may indicate translation motion from the video block position 310 in a previous picture $P_{T-1}$. However, because the CMV 312 was generated using a lower resolution picture, a video block that better matches the video block at the video block position 310 may have been missed. Accordingly, the FME block 214 may also consider other video blocks that are pointed to by the CMVs of neighboring blocks.

For example, if CMV_4 is associated with the macroblock 620, the FME block 214 may also process the CMVs of neighboring macroblocks 612, 614, 616, 618, 622, 624, 626, and 628. The FME block 214 may also process null motion vectors that may indicate zero translation movement for the macroblock 620 in the present picture $P_T$ with respect to one or more reference pictures.

In step 914, the confidences of the coarse motion vectors CMV0, CMV1, CMV2, CMV3, CMV4, CMV5, CMV6, CMV7, and CMV8 that correspond to the video block positions 612 . . . 628, respectively, may be processed to generate group confidences. These group confidences may correspond to the coarse motion vectors that point to the video blocks in the video block positions 612 . . . 628. The group confidences may take into account a block mode of a video block. For example, the video block in the video block position 620 may comprise two different motion vectors that apply to sub-blocks of the video block. The generation of the confidences will be described with respect to FIG. 9C.

In step 916, the FME block 214 may use a first stage process to generate an initial patch list. For example, non-null patches for luma and/or chroma video blocks for each reference picture may be sorted in a descending order according to the corresponding group confidences. Accordingly, in instances when 2 reference pictures are used, there may be a total of 36 patches that are sorted. For example, 9 patches may correspond to the 9 luma video blocks at the video block positions 612 . . . 628 for the first reference picture $P_{T-1}$, and 9 patches may correspond to the 9 chroma video blocks at the video block positions 612 . . . 628 for the first reference picture $P_{T-1}$. Similarly, 9 patches may correspond to the 9 luma video blocks at the video block positions 612 . . . 628 for the second reference picture $P_{T-2}$, and 9 patches may correspond to the 9 chroma video blocks at the video block positions 612 . . . 628 for the second reference picture $P_{T-2}$.

In step 918, the FME block 214 may use a second stage process to generate a final patch list. The final patch list may comprise inserting patches for the null vectors to the initial patch list. There may be, for example, 4 null vectors, where 2 null vectors may apply to the luma and chroma portions of the first reference picture, and 2 null vectors may apply to the luma and chroma portions of the second reference picture.

In step 920, the FME block 214 may use the final patch list, which may be similar to the priority ordered patch list 900, to determine the search area to use to find a best match for a macroblock being processed. As described with respect to FIG. 9, each entry in the final patch list may indicate whether that entry is a required entry or an optional entry. All required entries may be a part of the search area. The optional entries may be a part of the search area if the patches were read successfully from the memory.

For example, the number of entries that are allowed to be part of the search area may be 2. Accordingly, using the priority ordered patch list 900 for exemplary purposes, the first entry that is indicated to be required, may be a part of the search area. The next entry, which may be indicated to be optional, may also be added to the search area. The remainder of the entries in the priority ordered patch list 900 may not be used. Accordingly, the search area may comprise using the video data associated with the patch IDs 0 and 1 in the reference picture $P_{T-1}$.

The FME block 214 may then compare the video block being processed in the present picture $P_T$ with macroblocks in the search area to find the best match. A fine motion vector to the best matched macroblock may then be generated and associated with the video block being processed. In this manner, the video blocks in the present picture $P_T$ may be assigned fine motion vectors that may be more accurate than the CMVs generated by the CME block 212. The fine motion vectors generated by the FME block 214 may then be communicated to other portions of the image processor 112 for coding, or compressing, video data.

By dynamically changing the number of entries to use for the search area and/or the threshold level for inserting the null patches, the image processor 112 may allow scalable coding of video data. For example, making the search area larger by increasing the number of entries to use for a search area may generally result in more processing and more memory accesses for each fine motion vector generated. Similarly, making the search area smaller may generally result in less processing less memory accesses for each fine motion vector generated.

FIG. 9C is a diagram illustrating exemplary algorithm for calculating group confidences, in accordance with an embodiment of the invention. Referring to FIG. 9C, there is shown algorithms for calculating group confidences. The group confidences may be based on the CMVs generated by the CME block 212. For example, where a patch mode of a macroblock indicates that it is a single video block of 16 pixels by 16 pixels, the group confidence of the patch may be calculated as:

$$\text{Group\_Confidence\_}16\times16 = 4*(CMV4\_MV\_\text{Conf}) + K_{16\times16}, \quad (2)$$

where CMV4_MV_Conf may be the confidence associated with the macroblock 620. The parameter $K_{16\times16}$ may be a constant that may be design dependent, and may be used to weight the confidences in favor of the 16 pixel by 16 pixel video block.

For a patch that comprises two video blocks of 16 pixels by 8 pixels, the group confidence of the patch may be calculated as:

$$\text{Group\_Confidence\_}16\times8 = 2*(CMV1\_MV\_\text{Conf} + CMV7\_MV\_\text{Conf}) + K_{16\times8}, \quad (3)$$

where CMV1_MV_Conf may be the confidence associated with the macroblock 614, and CMV7_MV_Conf may be the confidence associated with the macroblock 626. The parameter $K_{16\times8}$ may be a constant that may be design dependent, and may be used to weight the confidences in favor of the 16 pixel by 8 pixel video blocks.

For a patch that comprises two video blocks of 8 pixels by 16 pixels, the group confidence of the patch may be calculated as:

$$\text{Group\_Confidence\_}8\times16 = 2*(CMV3\_MV\_\text{Conf} + CMV5\_MV\_\text{Conf}) + K_{8\times16}, \quad (4)$$

where CMV3_MV_Conf may be the confidence associated with the macroblock 618, and CMV5_MV_Conf may be the confidence associated with the macroblock 322. The parameter $K_{8\times16}$ may be a constant that may be design dependent, and may be used to weight the confidences in favor of the 16 pixel by 16 pixel video block.

For a patch that comprises 4 video blocks of 8 pixels by 8 pixels, the group confidence of the patch may be calculated as:

$$\text{Group\_Confidence\_}8\times8 = CMV0\_MV\_\text{Conf} + CMV2\_MV\_\text{Conf} + CMV6\_MV\_\text{Conf} + CMV8\_MV\_\text{Conf}, \quad (5)$$

where CMV0_MV_Conf, CMV2_MV_Conf, CMV6_MV_Conf, and CMV8_MV_Conf may be the confidences associated with the macroblocks 612, 616, 624, and 628.

Accordingly, a patch may have a group confidence that may be calculated via one of the equations 2-5. There may also be generated a maximum group confidence for each reference. The maximum group confidence Group_Confidence_Max may be described as:

$$\text{Group\_Confidence\_Max} = \text{MAX}[\text{Group\_Confidence\_}16\times16, \text{Group\_Confidence\_}16\times8, \text{Group\_Confidence\_}8\times16, \text{Group\_Confidence\_}8\times8], \quad (6)$$

where the Group_Confidence_Max may be a maximum group confidence value with respect to all the patches in the video block positions 612 ... 628 in each temporal reference picture. Accordingly, the maximum group confidence Group_Confidence_Max may be a maximum of the group confidences for the patches with patch IDs 1-9, inclusive. If there are two reference pictures, then there may be two maximum group confidences Group_Confidence_Max_Ref0 and Group_Confidence_Max_Ref1.

The groups may be sorted according to the group confidence and the corresponding patches may be written to the initial ordered priority list. The sorting may be performed by, for example, the processor 114 and/or the image processor 112. There may be 9 patches for chroma and 9 patches for luma for each reference picture. Accordingly, in cases where two reference pictures are used, there may be 36 patches sorted by group confidence.

In a second stage, the following exemplary algorithm may be used to insert the null patches that correspond to luma and chroma for the first reference picture and to luma and chroma for the second reference picture, for luma and chroma, in turn:

1. If both Group_Confidence_Max_Ref0 and Group_Confidence_Max_Ref1 are lower than a threshold confidence level, then null patches of the two reference pictures may be inserted to the top of the priority ordered patch list 600. The null patch may correspond to the patch ID 0. The order of the null patches may be design dependent. An exemplary design may insert a present null patch being processed above a previous null patch.
2. Else if only Group_Confidence_Max_Ref0 is lower than a threshold confidence level, then the null patch for the first reference picture may be inserted to the top of the priority ordered patch list 600. The null patch for the second reference picture may be inserted at the bottom of the priority ordered patch list 600.
3. Else if only Group_Confidence_Max_Ref1 is lower than a threshold confidence level, then the null patch for the second reference picture may be inserted to the top of the priority ordered patch list 600. The null patch for the first reference picture may be inserted at the bottom of the priority ordered patch list 600
4. Else both null patches may be inserted at the bottom of the priority ordered patch list 600. The order of the null patches may be design dependent. An exemplary design may insert a present null patch being processed below a previous null patch.

The threshold confidence level may be design dependent. For example, the threshold confidence level may be set to a default value. The threshold confidence level may also be dynamically changed by, for example, the processor 114 and/or the image processor 112. The null patch may also be referred to as a null video block.

Accordingly, for each specific video block position, a null patch may be placed at the top of the patch list if all group confidences that correspond to that reference picture are lower than a threshold value. This may indicate that a null motion vector for that specific video block position may be a better choice than any of the motion vectors to other patches. Similarly, if any patch has a confidence that is greater than the threshold value, the null patch may be placed at the bottom of the patch list. That is, if any patch confidence indicates that there is a likelihood that a null motion vector is not the best choice, then the null patch should not be used.

In accordance with an embodiment of the invention, aspects of an exemplary system may comprise the FME block 214 receiving a plurality of CMVs and corresponding confidences from the CME block 212. The FME block 214 may generate a patch list based on the corresponding confidences of the CMVs. The FME block 214 may use other circuitry in the image processor 112, the processor 114, and/or the memory block 116 in generating the patch list. The FME block 214 may then generate a fine motion vector for each video block in a present picture, for example, by conducting a search in a search area, where the search area may have been determined based on the patch list. The search may comprise matching a video block in the present picture with video blocks, or patches, in the search area to determine a best match. The fine motion vector indicating translational motion from the best matched patch in the search area to the video block in the present picture may then be generated for the video block in the present picture.

Accordingly, a group confidence may be generated for each macroblock 612 . . . 628, where the group confidences may be based on the confidences of the CMVs for the video blocks. The patch list may be generated by first sorting luma patches and/or chroma patches for each reference picture by the corresponding group confidences. Null patches may then be added to the patch list. For example, a null patch may be inserted as a first entry of the patch list when the maximum group confidence for the corresponding luma or chroma portion of a reference picture is below a threshold value. A null patch may be inserted as a last entry of the patch list when the maximum group confidence for the corresponding luma or chroma portion of a reference picture is greater than or equal to the threshold value.

The image processor 112, and/or the processor 114 may generate the patch list. The image processor 112 and/or the processor 114 may also initially determine the number of entries to be used in generating the search area, as well as dynamically change the number of entries to be used in generating the search area.

While the video coder block 210 may have been described as processing video blocks that are as small as 8 pixels by 8 pixels and as large as 16 pixels by 16 pixels, the invention need not be so limited. Various embodiments of the invention may use different video block sizes.

Another embodiment of the invention may provide a machine-readable storage, having stored thereon, a computer program having at least one code section executable by a machine, thereby causing the machine to perform the steps as described above for using motion vector confidence to determine a fine motion estimation patch priority list for a scalable coder.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing video signals, the method comprising:
   receiving a plurality of coarse motion vectors and a plurality of corresponding motion vector confidences for each of the coarse motion vectors, each of the corresponding motion vector confidences being proportional to a probability that the respective coarse motion vector depicts actual translational motion of a respective video block;
   generating a patch list based on the corresponding motion vector confidences of the coarse motion vectors, the patch list being ordered according to a priority of a plurality of entries of the patch list;
   sorting non-null patches in the patch list by a plurality of corresponding group confidences, each of the corresponding group confidences applying to a group of coarse motion vectors associated with the corresponding non-null patch; and
   generating a fine motion vector for a video block by searching a search area based on the sorted patch list ordered according to the priority.

2. The method according to claim 1, wherein the patch list comprises at least one of luma patches and chroma patches.

3. The method according to claim 1, wherein the patch list includes a null patch representing another video block having a same position in a reference picture as compared to the video picture.

4. The method according to claim 1, wherein the sorting of the patch list sorts in a decreasing order of the group confidence for the non-null patches.

5. The method according to claim 4, comprising placing a null patch as a first entry of the patch list when a maximum group confidence corresponding to the null patch is below a threshold value.

6. The method according to claim 4, comprising placing a null patch as a last entry of the patch list when a maximum group confidence corresponding to the null patch is greater than or equal to a threshold value.

7. The method according to claim 1, comprising dynamically determining a number of entries to use from the patch list in generating the search area.

8. The method according to claim 1, wherein each of the motion vector confidences predicts a quality of the respective coarse motion vector.

9. The method according to claim 1, wherein each of the non-null patches in the patch list is associated with one or more coarse motion vectors of the plurality of coarse motion vectors and one or more corresponding motion vector confidences of the one or more coarse motion vectors, and each of the group confidences is generated based on the one or more corresponding motion vector confidences of the one or more coarse motion vectors associated with the corresponding non-null patch.

10. A system for processing video signals, the system comprising:
    one or more circuits configured to:
    receive a plurality of coarse motion vectors and corresponding motion vector confidences for each of the coarse motion vectors, each of the corresponding motion vector confidences being proportional to a probability that the respective coarse motion vector depicts actual translational motion of a respective video block;
    generate a prioritized patch list based on the corresponding motion vector confidences of the coarse motion vectors and a plurality of group confidences, the patch list being ordered according to a priority of a plurality of entries of the patch list, each of the plurality of group confidences applying to a group of coarse motion vectors associated with a corresponding non-null patch; and generate a fine motion vector for a video block by searching a search area based on the patch list.

11. The system according to claim 10, wherein the one or more circuits comprise one or more processors configured to sort the patch list in a decreasing order of the group confidence for non-null patches.

12. The system according to claim 11, wherein the one or more circuits comprise one or more processors configured to place a null patch as a first entry of the patch list when a maximum group confidence corresponding to the null patch is below a threshold value.

13. The system according to claim 11, wherein the one or more circuits comprise one or more processors configured to place a null patch as a last entry of the patch list when a maximum group confidence corresponding to the null patch is greater than or equal to a threshold value.

14. The system according to claim 10, wherein each of the motion vector confidences is a measure of a probability that the respective coarse motion vector is accurate.

15. The system according to claim 10, wherein the one or more circuits comprise one or more processors configured to generate the group confidences, each of the group confidences being generated based on one or more corresponding motion vector confidences of the one or more coarse motion vectors associated with the corresponding non-null patch.

16. A video coder comprising:

a coarse motion estimator configured to generate a plurality of coarse motion vectors and corresponding motion vector confidences for each of the coarse motion vectors, each of the corresponding motion vector confidences being proportional to a probability that the respective coarse motion vector depicts actual translational motion of a respective video block; and a fine motion estimator configured to generate a prioritized list of patches based on the corresponding motion vector confidences of the coarse motion vectors and further configured to generate a fine motion vector for a video block by searching a search area specified by the prioritized list of patches in order of the prioritized list of patches.

17. The video coder of claim 16, wherein the fine motion estimator is further configured to perform the search of the search area using all required patches in the prioritized list of patches.

18. The video coder of claim 16, wherein the fine motion estimator is further configured to perform the search of the search area using an optional patch in the prioritized list of patches conditionally based upon resource availability.

19. The video coder of claim 16, wherein the fine motion estimator is further configured to calculate, from the motion vector confidences, a priority associated with each of a plurality of non-null patches, and to store the patches in a memory, and to read one or more patches from the memory according to the priorities.

20. The video coder of claim 16, wherein the fine motion estimator is further configured to generate the prioritized list of patches based on a plurality of group confidences, each of the group confidences being generated based on one or more corresponding motion vector confidences of the one or more coarse motion vectors associated with a corresponding non-null patch in the list of patches.

* * * * *